(12) United States Patent
Shukla et al.

(10) Patent No.: US 8,249,161 B2
(45) Date of Patent: Aug. 21, 2012

(54) VIDEO DECODER INCORPORATING REVERSE VARIABLE LENGTH DECODING

(75) Inventors: Mahesh Narain Shukla, Delhi (IN); Dipti Rani Taur, Noida (IN)

(73) Assignee: STMicroelectronics International NV, Amsterdam (NL)

( * ) Notice: Subject to any disclaimer, the term of this patent is extended or adjusted under 35 U.S.C. 154(b) by 1420 days.

(21) Appl. No.: 11/536,555

(22) Filed: Sep. 28, 2006

(65) Prior Publication Data

US 2007/0076800 A1    Apr. 5, 2007

(30) Foreign Application Priority Data

Sep. 30, 2005   (IN) .............................. 2624/Del/2005

(51) Int. Cl.
*H04N 11/02*     (2006.01)
*H04N 7/12*      (2006.01)
(52) U.S. Cl. .............................. 375/240.23; 375/240.27
(58) Field of Classification Search .......................... None
See application file for complete search history.

(56) References Cited

U.S. PATENT DOCUMENTS

| | | | | |
|---|---|---|---|---|
| 5,220,325 | A | * | 6/1993 | Ackland et al. ................. 341/67 |
| 5,363,097 | A | * | 11/1994 | Jan ................................... 341/67 |
| 6,304,607 | B1 | * | 10/2001 | Talluri et al. ............. 375/240.27 |
| 6,795,503 | B2 | * | 9/2004 | Nakao et al. ............. 375/240.16 |

OTHER PUBLICATIONS

Communication pursuant to Article 94(3) EPC, application No. 06 020 701.6-2223, issued Jan. 31, 2011, pp. 6.
Tsai, Chien-Wu, et al., "On Constructing the Huffman-Code-Based Reversible Variable-Length Codes", IEEE Transactions on Communications, vol. 49, No. 9, Sep. 2001, pp. 1506-1509.
Ducla-Soares, Luis, et al., "Error resilience and concealment performance for MPEG-4 frame-based video coding", Elsevier, Signal Processing: Image Communication 14 (1999) pp. 447-472.

* cited by examiner

*Primary Examiner* — Joseph Ustaris
*Assistant Examiner* — Mikhail Itskovich
(74) *Attorney, Agent, or Firm* — Hogan Lovells US LLP

(57) ABSTRACT

A video decoder receiving an encoded bit stream includes a header decoder which receives the encoded bit stream, a variable length decoder connected to the header decoder which receives the header decoded data, a quantizer and compensator connected to the variable length decoder, for, during backward decoding, performing inverse quantization, transformation and motion compensation of the variable length decoded data. The inverse quantization, transformation and motion compensation of the header decoded data is done consecutively to provide complete decoded data till a first point in the backward direction such that the first point is either the error point or a point before the end point of the macroblock containing error detected in the forward direction and the output buffer is connected to the quantizer and compensator for storing complete decoded data, thereby eliminating the use of intermediate buffer for storing variable length decoded data during backward decoding and reducing the number of computations.

11 Claims, 6 Drawing Sheets

|  | foreman_complete_ res_data_rvlc_128_ critical_first_free | foreman_complete_ res_data_rvlc_128_ critical_header_free | foreman_complete_ res_data_rvlc_504_ critical_first_free | foreman_complete_ res_data_rvlc_504_ critical_header_free |
|---|---|---|---|---|
| Strategy-1 | 2 | 1 | 13 | 18 |
| Strategy-2 | 0 | 0 | 8 | 4 |
| Strategy-3 | 3 | 4 | 36 | 49 |
| Strategy-4 | 11 | 15 | 127 | 118 |

Figure 8—Table 1

| Effective Blocks<br>Test Vectors | IdctWang_i Original | IdctWang_p Original | IdctWang_i RVLD mod | IdctWang_p RVLD mod | extra I | extra P |
|---|---|---|---|---|---|---|
| foreman_complete_ res_data_rvlc_504_ critical_first_free.out | 2892 | 3167 | 2892 | 3174 | 0 | 7 |
| foreman_complete_ res_data_rvlc_504_ critical_header_free.out | 2670 | 3216 | 2670 | 3228 | 0 | 12 |
| foreman_complete_ res_data_rvlc_128_ critical_first_free.out | 600 | 1717 | 600 | 1719 | 0 | 2 |
| foreman_complete_ res_data_rvlc_128_ critical_header_free.out | 582 | 1643 | 582 | 1643 | 0 | 0 |

Figure 9—Table 2

| Cycles for different test-vectors / Different functions Of the decoder | (foreman_complete_res_data_rvlc_128_critical_first_free) Profiling Results with Origi | (foreman_complete_res_data_rvlc_128_critical_first_free) Profiling Results after RVLD mod | (foreman_complete_res_data_rvlc_504_critical_first_free) Origi | (foreman_complete_res_data_rvlc_504_critical_first_free) RVLD Mod | (foreman_complete_res_data_rvlc_504_critical_header_free) Orig | (foreman_complete_res_data_rvlc_504_critical_header_free) RVLD mod |
|---|---|---|---|---|---|---|
| IdctWang_p | 958483 | 961301 | 1765023 | 1773522 | 1791732 | 1802878 |
| IdctWang_i | 376355 | 376388 | 1814548 | 1818117 | 1675562 | 1679564 |
| motocomp | 319918 | 321228 | 303913 | 307685 | 281219 | 285501 |
| Motocomp_4MV | 437877 | 435849 | 371374 | 370355 | 354544 | 352587 |
| recon_simple_luma | 281463 | 281678 | 257878 | 259685 | 235394 | 237535 |
| recon_simple_chroma | 123122 | 129882 | 116348 | 122017 | 106258 | 113759 |
| recon_horizontal_luma | 616610 | 610786 | 554976 | 553705 | 555409 | 553367 |
| recon_horizontal_chroma | 444676 | 451720 | 451026 | 460427 | 438764 | 452519 |
| recon_vertical_luma | 506988 | 518637 | 417060 | 428278 | 404701 | 416030 |
| recon_vertical_chroma | 353654 | 353567 | 280832 | 282150 | 253326 | 254741 |
| recon_hor_ver_luma | 2839676 | 2841352 | 2805260 | 2825569 | 2581080 | 2590290 |
| recon_hor_ver_chroma | 2466541 | 2465228 | 2259840 | 2276310 | 2112177 | 2119062 |
| addblock_p | 426096 | 427826 | 784028 | 789089 | 795844 | 802033 |
| addblock_i | 139998 | 140078 | 674999 | 674378 | 623205 | 622686 |
| Total MCPS | 29.47 | 30.1 | 63.1 | 63.37 | 61.81 | 62.13 |

Figure 10—Table 3

VIDEO DECODER INCORPORATING REVERSE VARIABLE LENGTH DECODING

RELATED APPLICATION

The present application claims priority of India Patent Application No. 2624/Del/2005 filed Sep. 30, 2005 and entitled A VIDEO DECODER HAVING EFFICIENT IMPLEMENTATION OF REVERSE VARIABLE LENGTH DECODING, which is incorporated herein in its entirety by this reference.

FIELD OF THE INVENTION

The present invention relates to video decoders implementing Reverse Variable Length Decoding (RVLD) compliant to video codec standards.

BACKGROUND OF THE INVENTION

Encoder standards efficiently represent video image sequences as compactly coded data. Further, these standards describe decoding (reconstruction) process by which encoded bit streams are mapped from compressed data to the raw video signal data suitable for video display.

The video decoding process is generally the inverse of the video encoding process and is employed to reconstruct a motion picture sequence from a compressed and encoded bitstream. Generally, video bitstream data is decoded according to syntax defined by the encoder standards. The decoder must first identify the beginning of a coded picture, identify the type of picture, and then decode each individual macroblock within a particular picture.

Generally, encoded video data is received in a rate or a video buffer verifier (VBV). The data is retrieved from the channel buffer by a decoder or reconstruction device for performing the decoding. Decoders, such as MPEG decoder, perform inverse scanning to remove any zig zag ordering and inverse quantization to de-quantize the data. Where frame or field DCTs are involved, decoding process utilizes frame and field Inverse Discrete Cosine Transforms (IDCTs) to decode the respective frame and field DCTs, and converts the encoded video signal from the frequency domain to the time domain to produce reconstructed raw video signal data.

Decoder also performs motion compensation using transmitted motion vectors to reconstruct temporally compressed pictures. Decoder examines motion vector data, determines the respective reference block in the reference picture, and accesses the reference block from the frame buffer. After the decoder has Huffman decoded all the macroblocks, the resultant coefficient data is then inverse quantized and operated on by an IDCT process to transform macroblock data from a frequency domain to data in space domain. Frames may need to be re-ordered before they are displayed in accordance with their display order instead of their coding order. After the frames are re-ordered, they may then be displayed on an appropriate device.

FIG. 1 shows a block diagram of a typical video decoding system, as is known in the art. Shown in the figure are an Input Compressed Bit-stream 10, a header decoder 11, a Huffman decoder 12, a Quantizer & Compensator Block 13 and an output buffer 14. The header decoder 11 receives a compressed bit-stream 10 that includes video and audio data. The data elements received from the output of header decoder 11 are Huffman decoded i.e. variable length decoding (VLD/RVLD) is performed and are reordered to produce a set of quantized coefficients. Although Huffman decoder 12 is used, however, other decoders that perform variable length decoding can be used. The variable length decoded data is rescaled/de-quantized ($Q^{-1}$), inverse transformed (IDCT) and motion compensated by Quantizer & Compensator Block 13. The motion compensation is performed using the header information decoded from the bit-stream (and the decoded motion vectors), to produce an output frame. In alternative embodiments, variation of the aforesaid video decoder can be used. Further in alternate embodiments, the Quantizer & Compensator Block 13 can be split as different blocks.

The Huffman coded data i.e. Reversible Variable Length Codes (RVLC) are designed such that they can be instantaneously decoded both in forward and reverse directions. A part of a bit-stream, which cannot be decoded in the forward direction due to the presence of errors, can often be decoded in the backward direction. This is illustrated in the FIG. 2. Therefore number of discarded bits can be reduced, enabling an improvement in quality. RVLC is applied only to Texture Information.

Initially decoding in the forward direction is performed. If no errors are detected, the bit-stream is assumed to be valid and the decoding process is finished for that Video Packet (VP). If an error is detected, two-way decoding is applied. If an error is detected in the forward decoding, the decoder resynchronizes at the next suitable resynchronization point (vop_start_code or resync_marker) and starts Huffman-decoding in the backward direction, till it gets an error point in the backward direction. With the help of information gathered in the forward and backward direction, decoder adopts one of the four strategies (described in the following part of the description) to determine the macroblocks to be decoded/discarded.

The following strategies for determining which bits (and hence MBs) to discard are used. These strategies are described using the figures along with the following definitions:

An error-point is detected if
(1) An illegal RVLC is found where an illegal RVLC is defined as follows:
    A codeword whose pattern is not listed in the RVLC table (e.g. 169 codeword patterns and escape codes).
    Escape coding is used (i.e., a legal codeword is not available in the RVLC table) and the decoded value for LEVEL is zero.
    The second escape code is incorrect (e.g. codeword is not "00000" or "00001" for forward decoding, and/or is not "00001" for backward decoding).
    There is a decoded value of FLC part using escape codes (e.g. LAST, RUN, LEVEL) in the RVLC table.
    An incorrect number of stuffing bits for byte alignment (e.g. eight or more 1s follow 0 at the last part of a Video packet (VP), or the remaining bit pattern is not "0111 . . . " after decoding process is finished).
(2) More than 64 DCT coefficients are decoded in a block.

Strategy-1: L1+L2<L and N1+N2<N
    Macroblocks (MBs) of f_mb (L1–T) from the beginning and MBs of b_mb(L2–T) from the end are decoded while the MBs of the darker portion as shown in FIG. 3 are discarded.

Strategy-2: L1+L2<L and N1+N2>=N
    MBs of (N−N2−1) from the beginning and MBs of (N−N1−1) from the end are decoded while the MBs of the darker portion as shown in FIG. 4 are discarded.

Strategy-3: L1+L2>=L and N1+N2<N
    MBs of N−b_mb(L2) from the beginning and MBs of N−f_mb(L1) from the end are decoded while the MBs of the darker portion as shown in FIG. 5 are discarded.

Strategy-4: L1+L2>=L and N1+N2>=N

MBs of min {(N−b_mb(L2)), (N−N2−1)} from the beginning and MBs of min{(N−f_mb(L1)), (N−N1−1)} from the end are decoded while the MBs of the darker portion as shown in FIG. 6 are discarded.
where
L—Total number of bits for DCT coefficients part in a VP.
N—Total number of macroblocks (MBs) in a VP.
L1—Number of bits which can be decoded in a forward decoding.
L2—Number of bits which can be decoded in a backward decoding.
N1—Number of MBs which can be completely decoded in a forward decoding.

$$(0<=N1<=(N-1))$$

N2—Number of MBs which can be completely decoded in a backward decoding.

$$(0<=N2<=(N-1))$$

f_mb(S)—Number of decoded MBs when S bits can be decoded in a forward direction. (Equal to or more than one bit can be decoded in a MB, f_mb(S) counter is up.)
b_mb(S)—Number of decoded MBs when S bits can be decoded in a backward direction.
T—Threshold (90 bits is used now).

When RVLD is performed in the reverse direction, Huffman-decoded information is kept in a buffer and the corresponding MB index in a separate buffer. When the Huffman decoding in the reverse direction ends, then the possible "strategy" is finalized based on the decoded information. Once the "Strategy" is finalized, decoding (IDCT, motion-compensation, etc) is done on Huffman decoded code words.

The following abbreviations stand for
MB_NUMBER: Total number of 16×16 MBs in the frame
rvld_codes_backward [MB_NUMBER] [6] [64]: Array used for storing RVLD output
rvld_index_backward[MB_NUMBER] [6]: Array used for storing the index of last non zero DCT coefficient in the 8×8 block.

Total size required for the two buffers is 75.4 KB for QCIF resolution and 301.6 KB for CIF resolution.

The problem with the existing approach is now illustrated with the help of the following example. Assuming error occurs in (N1+1) MB while forward decoding, backward decoding is done from the end of the video packet. While backward decoding, RVLD output is stored in rvld_codes_backward array for every MB, till the error occurs at (N−N2−1) MB. The index of the last non-zero DCT coefficient is stored in rvld_index_backward for every MB. The MBs to be concealed are determined. Rest of the MBs are considered correct and undergo IDCT, motion compensation (for predicted or P blocks) and are finally written to the output buffer.

RVLD output and index of last non-zero coefficient for all the completely decoded MBs have to be stored in the array. Since number of MBs in a video packet can be as large as MB_NUMBER, the memory has to be allocated for all of them.

In the proposed approach complete decoding of a MB (RVLD, then Inverse Discrete Cosine Transform (IDCT), Motion-compensation etc) is performed in the reverse direction and the decoded data is kept in the output buffer. At the end of decoding, the possible "strategy" is finalized based on the decoded information. Once the "Strategy" is finalized, number of MBs to be concealed is determined.

The challenge in this proposed approach is to determine the point up to which complete-decoding in backward direction is to be performed because the strategy for identifying backward decodable point can only be finalized once the error-point is identified in the backward direction. If decoding is done till error point is reached, lot of irrelevant computation will be done causing cycle-count to shoot-up. Also backward decoding should not be terminated before the decodable point is reached as it will cause loss of relevant data and the output will not be in conformance with the video encoder standard.

SUMMARY OF THE INVENTION

To eliminate the above-mentioned drawbacks, an embodiment of the present invention minimizes or eliminates the buffer requirement while keeping a low computation-cost for RVLD implementation.

An embodiment of the present invention provides a video decoder that includes an encoded bit stream, a header decoder for receiving the encoded bit stream, a variable length decoder connected to the header decoder receiving the header decoded data, a quantizer and compensator connected to the variable length decoder during backward decoding for performing inverse quantization, transformation and motion compensation of the variable length decoded data wherein while backward decoding variable length decoding, said inverse quantization, transformation and motion compensation of the header decoded data is done consecutively to provide complete decoded data until a first point in the backward direction such that the first point is either the error point or a point before the end point of the macroblock containing error detected in the forward direction and, the output buffer connected to the quantizer and compensator for storing complete decoded data, thereby eliminating the use of intermediate buffer for storing variable length decoded data during backward decoding and reducing the number of computations.

Preferably, the variable length decoder is a Huffman decoder.

Also preferably, the variable length decoder performs variable length decoding of the first point being a point before the end point of the macroblock containing error detected in the forward direction until the error point is reached.

The point before the end point of the macroblock containing error is preferably computed by subtracting one and the macroblocks decoded in forward direction from the total number of macroblocks in the video packet.

The invention includes a method of decoding video data involving receiving an encoded bit stream, header decoding of the encoded bit stream, performing variable length decoding of the header decoded data, performing the variable length decoding, inverse quantization, transformation and motion compensation of the header decoded data consecutively until a first point in the backward direction, where the first point is either the error point or a point before the end point of the macroblock containing error detected in the forward direction, and storing the decoded data in the output buffer, thereby eliminating the step of intermediate storage of variable length decoded data during backward decoding and reducing the number of computations.

BRIEF DESCRIPTION OF THE ACCOMPANYING DRAWINGS

FIG. 1 shows the diagram of a conventional video decoder.
FIG. 2 illustrates Reversible Variable Length Codes being decoded in the forward and backward directions.
FIG. 3 illustrates strategy 1.
FIG. 4 illustrates strategy 2.

Figure 1:
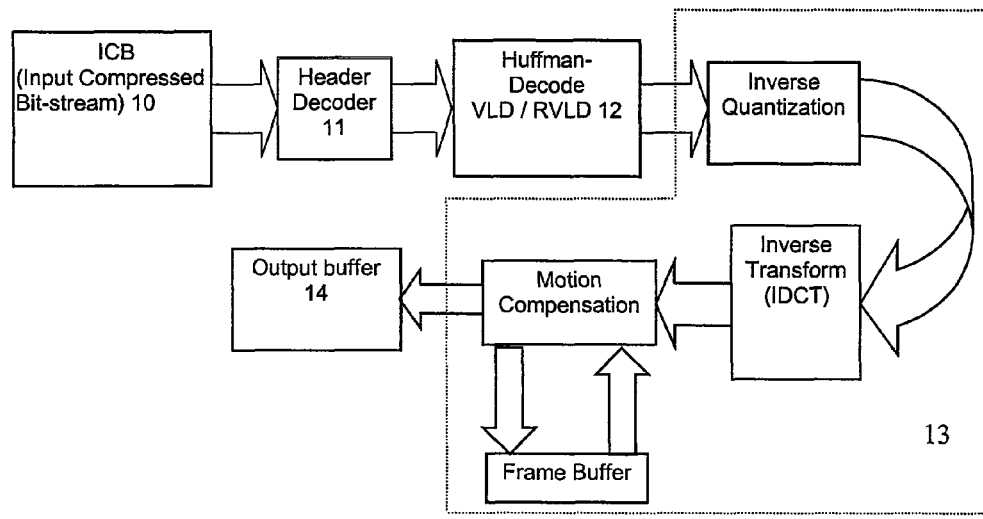
Figure 2:
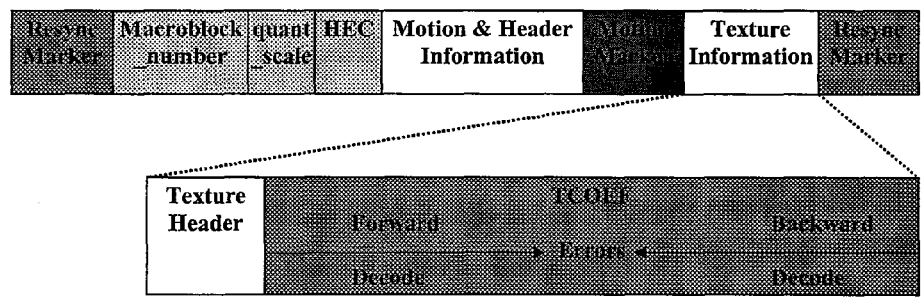
Figure 3:
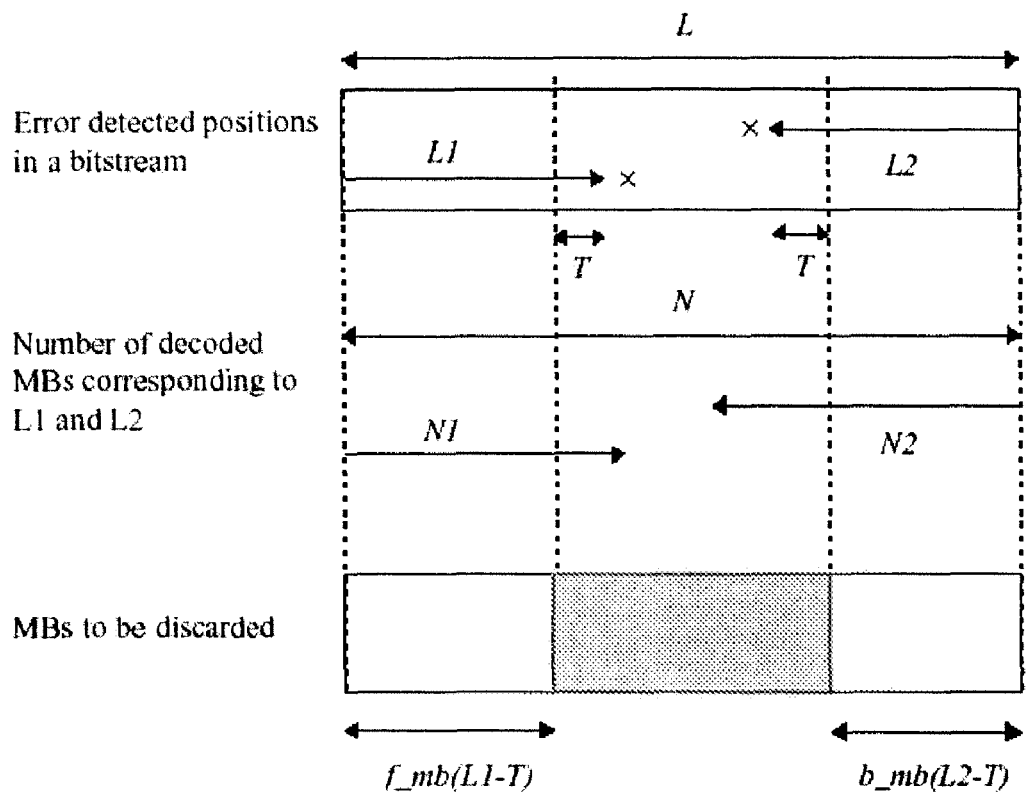
Figure 4:
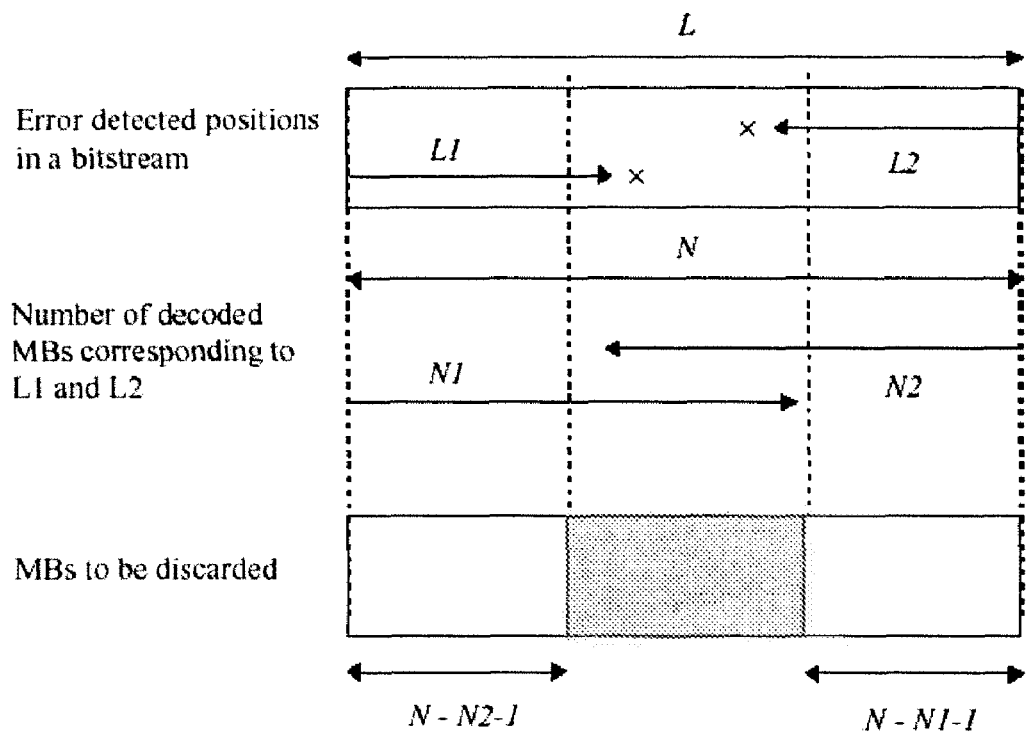
Figure 5:
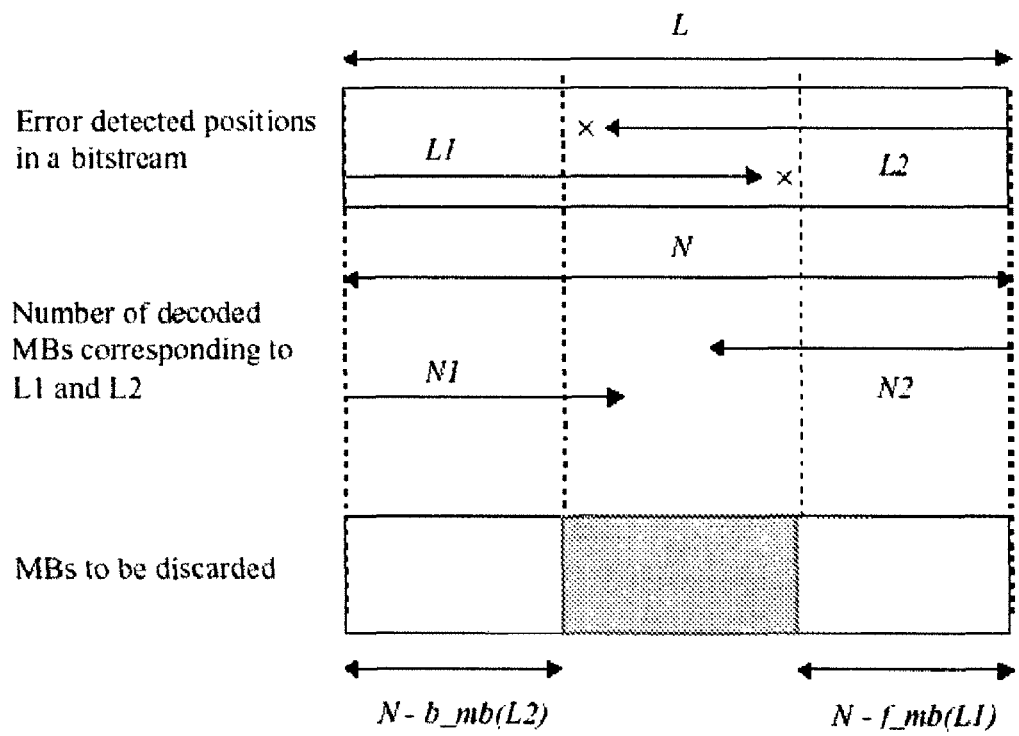
FIG. 5 illustrates strategy 3.
Figure 6:
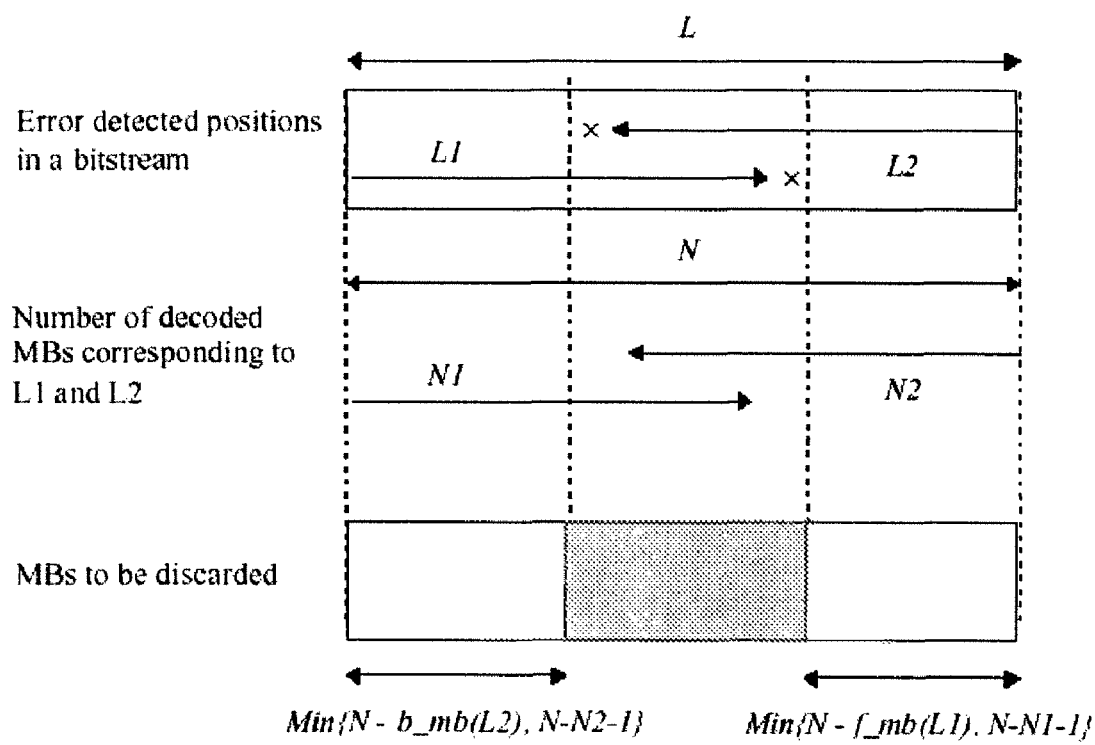
FIG. 6 illustrates strategy 4.

FIG. 8 presents a strategy distribution in an RVLD case, according to the present invention, in table format.

FIG. 9 shows the processing of extra I/P blocks (compute overhead) according to the present invention, in table format.

FIG. 10 illustrates the variation in cycle count for different functions of the decoder according to the present invention, in table format.

DETAILED DESCRIPTION

Before describing in detail the embodiments that are in accordance with the present invention, it should be observed that the embodiments reside primarily in combinations of method steps and apparatus components related to a video decoder and RVLC. Accordingly, the apparatus components and method steps have been represented where appropriate by conventional symbols in the drawings, showing only those specific details that are pertinent to understanding the embodiment of the present invention so as not to obscure the disclosure with details that will be readily apparent to those of ordinary skill in the art having the benefit of the description herein.

It will be appreciated that the embodiments of the invention described herein may be comprised of one or more conventional processors and unique stored program instructions that control the one or more processors to implement, in conjunction with certain non-processor circuits, some, most, or all of the functions of decoders described herein. The non-processor circuits may include, but are not limited to, a radio receiver, a radio transmitter, signal drivers, clock circuits, power source circuits, and user input devices. As such, these functions may be interpreted as steps of a method to perform decoding. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The instant invention rather than storing RVLD output into the buffers, decodes them fully after doing RVLD till a special point. The complete decoding involves IDCT, motion-compensation and writing into output buffer. On analyzing the four strategies, the maximum numbers of MBs, which can be considered for complete decoding, are (N−N1−1). To minimize the decoding effort in backward decoding, MBs are fully decoded (IDCT, motion-compensation and store into output buffer) only till (N−N1−1)th MB or the error block, whichever occurs first. However, if error does not occur at (N−N1−1)th MB, only RVLD (IDCT, motion-compensation and write to output buffer is *not* performed after (N−N1−1)th MB) is continued till the error occurs, to find the error point which is used for deciding the strategies and finding the MB's to be concealed.

Figure 7:
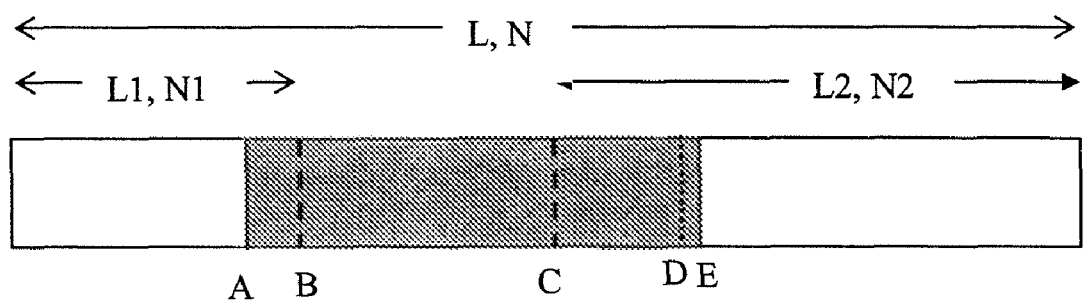
FIG. 7 illustrates a video packet according to the present invention.

FIG. 7 shows the diagram illustrating different points referred to while decoding a picture frame in accordance with the invention. Point A marks the point from which discarded data starts while point B indicates upto, which point RVLD is performed in forward direction due to presence of error point. Point C points to end of RVLD in the backward direction due to presence of error point. Point D is the novel point till which complete decoding namely, RVLD, inverse quantization, IDCT and motion-compensation is done in the backward direction to get L2, N2. Point E indicates the end of discarded data. The point D coincides with point E in most strategies.

Table 1 (FIG. 8) presents the strategy distribution in the RVLD case, in which
1. Max increase in MCPS=2.14%
2. From "Strategy" distribution, it can be noted that all the four test vectors use all the cases (Strategy-1 to Strategy-4).
3. Results show that deviation in cycle count occurs only in strategy-1 which is expected because of "T" (=90) bits of threshold (T=90 bit is chosen in the standard)

The proposed method presents a good trade-off between data-memory and MCPS. Moreover, the choice of decoding up to (N−N1−1) macroblock in the backward direction gives increase in computation only in stategy-1 as per theoretical assumption. Results prove the analysis of choosing (N−N1−1)th block in the backward direction without any compute overhead.

In strategy 2, there are no processing overheads involved, since (N−N1−1) blocks are always considered.

By definition, $$f\_mb(L1) > N1$$

$$N - f\_mb(L1) < N - N1 \quad (1)$$

Also, f_mb(L1)=N1+x

These x blocks can have maximum 1 non-skipped MB.

In strategy 3, $$N1 + N2 < N$$

Therefore, N2<N−N1 or N2<=N−N1−1

Since, N−f_mb(L1)<=N2, the proposed invention works with the same.

In strategy 4, min {N−f_mb(L1), N−N1−1} are considered. But according to (1), (N−N1−1) will always be maximal, and hence will always be compliant to the standard.

Thus, with this method, motion compensation, IDCT and output buffer store overheads can be optimized and the rvld_codes_backward and rvld_index_backward buffers can be completely eliminated. The data-memory is saved as:

75.4 KB for QCIF resolution and 301.6 KB for CIF resolution.

Table 2 (FIG. 9) shows the processing of extra I/P blocks (compute overhead) with the proposed method. It can be seen that the extra I/P blocks are highly minimized.

Table 3 (FIG. 10) illustrates variation in cycle count for different functions of the decoder with the proposed method.

Although the present invention has been described with reference to a preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A video decoder comprising:

an encoded bit stream;

a header decoder for receiving said encoded bit stream;

a variable length decoder coupled to said header decoder receiving header decoded data;

a quantizer and compensator coupled to said variable length decoder during backward decoding for consecutively performing inverse quantization, transformation and motion compensation of variable length decoded data to provide complete decoded data stopping at a first point in the backward direction such that said first point is either an error point or a point before an end point of a macroblock containing an error detected in the forward direction, whichever occurs first; and an output buffer coupled to said quantizer and compensator for storing said complete decoded data, thereby eliminating the use of an intermediate buffer for storing said variable length decoded data during backward decoding and reducing the number of computations.

2. The video decoder as claimed in claim 1 wherein said variable length decoder comprises a Huffman decoder.

3. The video decoder as claimed in claim 1 wherein said variable length decoder performs variable length decoding of said first point.

4. The video decoder as claimed in claim 3 wherein said point is computed by subtracting the number of macroblocks that are decoded in the forward direction, plus one, from the total number of macroblocks in a video packet.

5. A method of decoding video data comprising:
receiving an encoded bit stream;
header decoding of said encoded bit stream;
performing variable length decoding, inverse quantization, transformation and motion compensation of header decoded data consecutively stopping at a first point in the backward direction such that said first point is either an error point or a point before an end point of a macroblock containing an error detected in the forward direction, whichever occurs first; and
storing decoded data in an output buffer thereby eliminating the step of intermediate storage of variable length decoded data during backward decoding and reducing the number of computations.

6. The method of decoding as claimed in claim 5 wherein said variable length decoding comprises Huffman decoding.

7. The method of decoding as claimed in claim 5 wherein said first point is computed by subtracting the number of macroblocks that are decoded in the forward direction, plus one, from the total number of macroblocks in a video packet.

8. The method of decoding as claimed in claim 5 further comprising performing variable length decoding from said first point to the error point thereby reducing the number of computations.

9. A video decoder comprising:
an encoded bit stream;
a header decoder for receiving said encoded bit stream;
a variable length decoder coupled to said header decoder receiving header decoded data;
a quantizer and compensator coupled to said variable length decoder for performing inverse quantization, transformation and motion compensation of variable length decoded data to provide complete decoded data; and
an output buffer coupled to said quantizer and compensator for storing said complete decoded data,
wherein complete decoding of a macroblock is performed in the reverse direction stopping at a predetermined intermediate first point in the encoded bit stream and the decoded data is kept in the output buffer, and wherein
said first point comprises either an error point or a point before an end point of a macroblock containing an error detected in the forward direction.

10. The video decoder as claimed in claim 9 wherein said variable length decoder comprises a Huffman decoder.

11. The video decoder as claimed in claim 9 wherein said point is computed by subtracting the number of macroblocks that are decoded in the forward direction, plus one, from the total number of macroblocks in a video packet.

* * * * *